United States Patent
Oliver

(10) Patent No.: US 8,428,974 B2
(45) Date of Patent: Apr. 23, 2013

(54) RETIREMENT CONSUMPTION STRATEGY WITH DRAWDOWN ACCOUNT AND OPTION ANNUITY

(75) Inventor: Trevor T. S. Oliver, Oakland, CA (US)

(73) Assignee: Blackrock Institutional Trust Company, N.A., San Francisco, CA (US)

( * ) Notice: Subject to any disclaimer, the term of this patent is extended or adjusted under 35 U.S.C. 154(b) by 0 days.

(21) Appl. No.: 12/698,730

(22) Filed: Feb. 2, 2010

(65) Prior Publication Data
US 2010/0256995 A1 Oct. 7, 2010

Related U.S. Application Data

(60) Provisional application No. 61/149,562, filed on Feb. 3, 2009.

(51) Int. Cl.
*G06Q 4/00* (2006.01)
(52) U.S. Cl.
USPC .......................................................... 705/4
(58) Field of Classification Search ........................ 705/4
See application file for complete search history.

(56) References Cited

U.S. PATENT DOCUMENTS

2008/0010095 A1* 1/2008 Joyce ................................. 705/4
2009/0094070 A1* 4/2009 Harris et al. ...................... 705/4

OTHER PUBLICATIONS

Isas versus Sipps: Currie, Maike. Investors Chronicle (Feb. 10, 2009).*
Its vever too soon to face up to the future: Thomson, Lauren. The Times [London (UK0 Feb. 28, 2009: 64.*
Annuities : Barlow, Nigel. Investment Advisor (Mar. 23, 2009).*

* cited by examiner

*Primary Examiner* — Alexander Kalinowski
*Assistant Examiner* — Hatem M Ali
(74) *Attorney, Agent, or Firm* — Fenwick & West LLP

(57) ABSTRACT

In a drawdown strategy for an investor's retirement fund, assets from the fund are allocated between a drawdown account and an option annuity. The drawdown account contains assets that are invested in the markets, and the option annuity contains annuities that begin to pay at the end of a deferral period. In a first phase of investor's retirement, funds are drawn down from the drawdown account and paid to the investor, and the value of the option annuity grows as proceeds from the option annuity are accumulated by the option annuity. At some point the drawdown account is depleted, which corresponds to the end of the deferral period for the option annuity. At this time, a second phase of the retirement begins wherein the investor receives payments from the option annuity, and this continues for the remainder of the investor's life.

20 Claims, 4 Drawing Sheets

RETIREMENT CONSUMPTION STRATEGY WITH DRAWDOWN ACCOUNT AND OPTION ANNUITY

CROSS REFERENCE TO RELATED APPLICATIONS

This application claims the benefit of U.S. Provisional Application No. 61/149,562, filed Feb. 3, 2009, which is incorporated by reference in its entirety.

BACKGROUND

This invention relates generally to financial services and products, and more particularly to financial systems that implement a retirement consumption strategy that provides an investor with exposure to markets for a period of time and lifetime payments thereafter.

There remains a gap that has not yet been sufficiently addressed in the retirement income space Annuities, or various investments having similar properties, meet the needs of those with high risk aversions who are willing to exchange market participation for income stability. On the other end of the risk spectrum are those with low risk aversions who willingly forgo stable income in favor of market participation. Thus, the needs of the extremes are met, but the needs of the moderate are not. What are needed, therefore, are retirement strategies that provide not only the valuable options for those trying to manage their own retirement income needs, but also a much needed building block for institutions to build a product that has both income guarantees and market participation.

SUMMARY

Embodiments of the invention provide financial systems that implement drawdown strategies that take assets invested in a retirement fund and turn them into a cash flow by selling assets and returning them to investors. In one embodiment of the invention, the value of assets from a retirement fund is allocated between a drawdown account and an option annuity in a way that maximizes expected consumption during the retirement period. The drawdown account contains assets that are invested in the markets, and the option annuity contains annuities that begin to pay at the end of a deferral period (when the option annuity is exercised) and continue for the life of the investor. In a first phase of investor's retirement, funds are drawn down from the drawdown account and paid to the investor, and the value of the option annuity grows as proceeds from the option annuity are accumulated by the option annuity. At some point the drawdown account is depleted, which corresponds to the end of the deferral period for the option annuity. At this time, a second phase of the retirement begins wherein the investor receives payments from the option annuity, and this continues for the remainder of the investor's life.

During the first phase, the drawdown account may overperform or underperform, relative to the expectation on which the initial allocation between the drawdown account and option annuity was based. If this occurs, the cash flow and the expected deferral period may be adjusted to account for the performance deviation of the drawdown account. For example, if the drawdown account overperforms expectations, the consumption and the deferral period would be increased. As a result, the investor would receive additional payments per period for the remainder of the investor's retirement (subject to future performance relative to the now-modified expectation), and the annuity payments would begin later. On the other hand, if the drawdown account underperforms expectations, the consumption is decreased and the deferral period arrives sooner. Once the deferral period is reached, however, there is no further volatility because the annuity payments are fixed for the remainder of the investor's life.

In one embodiment, the option annuity accumulates in accrued cash flow, rather than providing payments to the investor (annuitant), until at a date chosen in the future, after the annuity contract is made. The determination of when payments begin may be decided by a fund manager, rather than by the annuitant, to achieve better pricing for the annuity.

DETAILED DESCRIPTION

Managed Retirement Consumption Strategy

Figure 1:
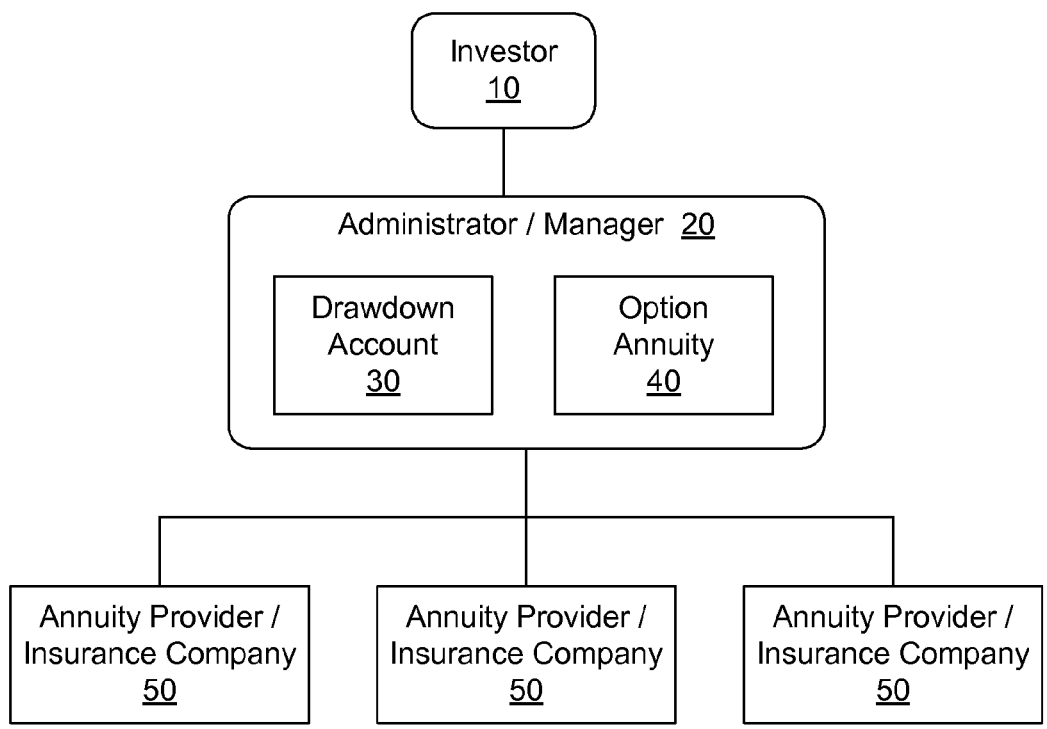
FIG. 1 is a diagram of a basic structure of the relationships among the actors in a retirement consumption strategy, in accordance with an embodiment of the invention.

FIG. 1 illustrates a basic structure of one embodiment of the relationships in the retirement consumption strategy. As illustrated, an investor 10 deals with an administrator 20 (or manager) of the retirement consumption strategy, which may provide the service as a financial product for the investor to purchase. The administrator 20 maintains a drawdown account 30 and an option annuity 40 for each investor. The option annuity 40 may be obtained by the administrator from one or more annuity providers 50, or insurance companies, by contract where the investor is a beneficiary of the annuity contract. The option annuity 40 is described in more detail below.

Figure 2:
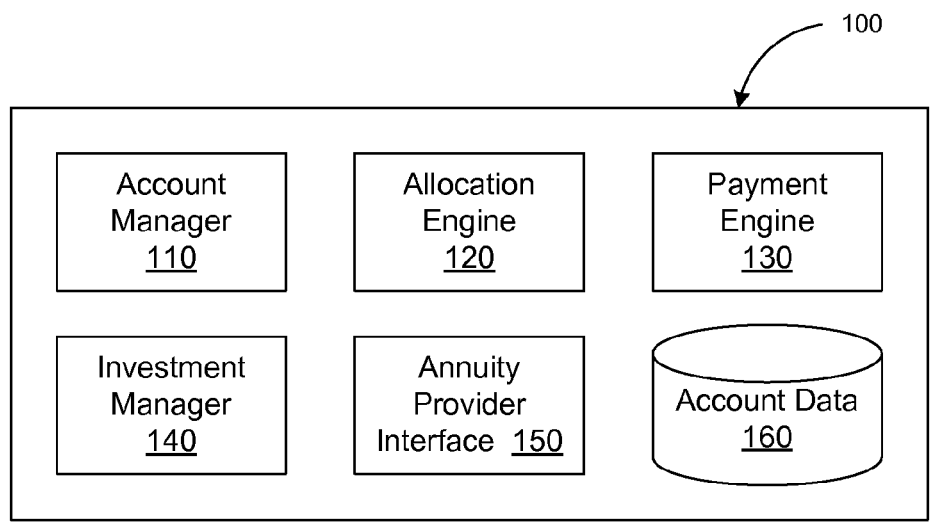
FIG. 2 is a diagram of a system used by a administrator for managing the retirement consumption strategy for one or more investors, in accordance with an embodiment of the invention.

FIG. 2 illustrates a system 100 used by the administrator 20 for managing the retirement consumption strategy for one or more investors. In this embodiment, the system includes an account manager 110, which maintains basic account information for each investor. This account information may be stored in the account data storage 160. The system 100 may also include an investment manager 140 for managing the investments of the drawdown account 30; an allocation engine 120 for determining an optimal initial allocation between the drawdown account 30 and the option annuity 40, as well as an optimal consumption amount during the retirement period; an annuity provider interface 150 for managing the option annuities 40 with the annuity providers; and a payment engine 130 for making periodic payments to the investors. In embodiments of the invention, these components are implemented using one or more computer systems, programmed with appropriate software for performing the operations described herein. It will be understood that many variations on this system 100 are possible within the scope of the invention.

Figure 3:
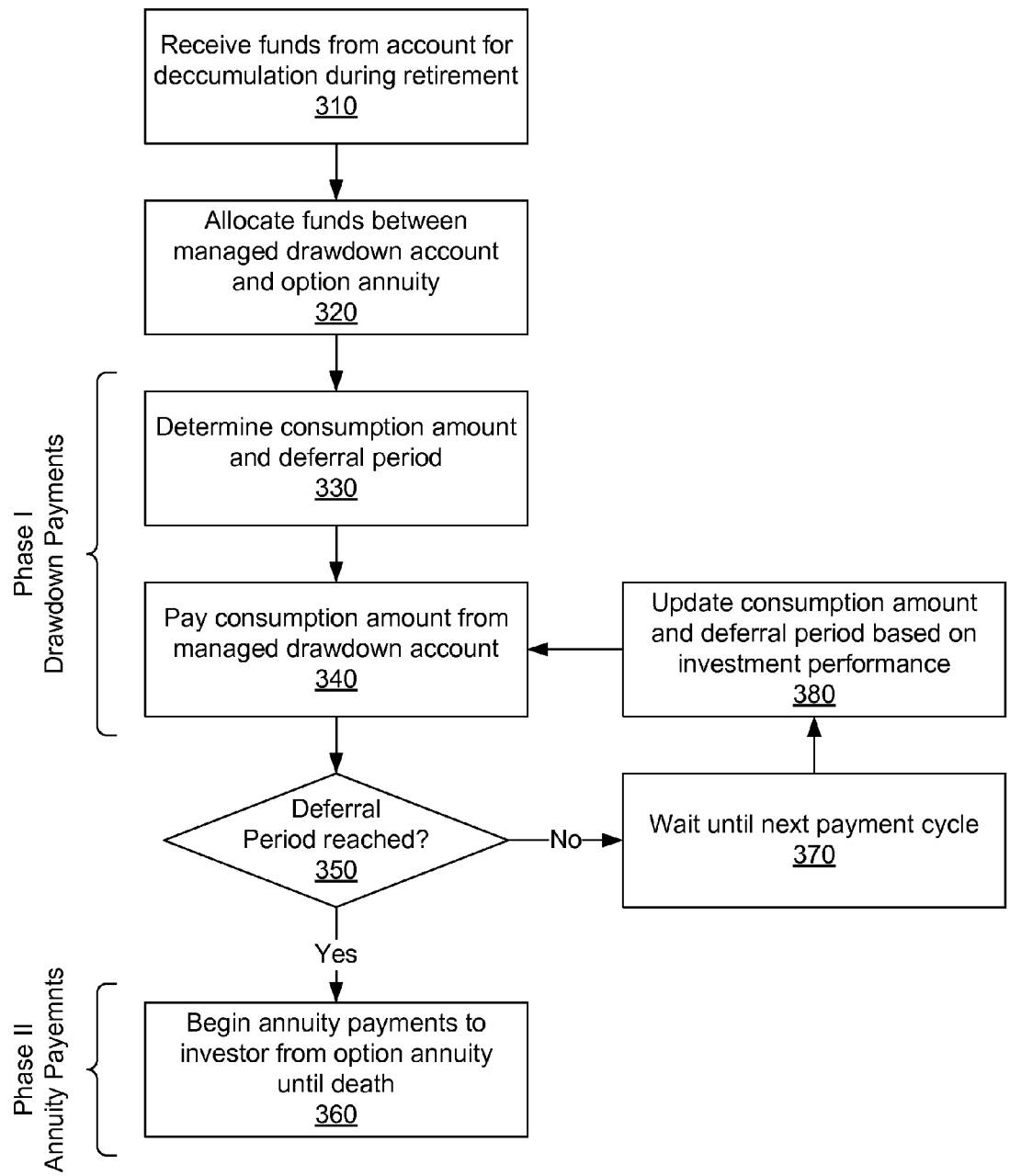
FIG. 3 is a flowchart of a process for implementing a managed retirement consumption strategy, in accordance with an embodiment of the invention.

FIG. 3 is a flowchart of a process for implementing a managed retirement consumption strategy in one embodiment of the invention. The process begins when an investor provides 310 funds from the investor's retirement account. This step may occur when an investor purchases shares of a retirement consumption product offered by the administrator 20. The administrator 20 then determines 320 an initial allocation of these funds. This allocation may include an allocation of the funds between the drawdown account 30 and the option annuity 40, as well as an investment allocation of the funds within the drawdown account 30. Although a very conservative investment mix may be preferable for an investor in the retirement years, any investment strategy may be used for the drawdown account 30. The drawdown account 30 may be actively managed, may track an index, or may follow any other investment strategy or combination thereof that provides the investor with exposure to the investment markets. More risky investment strategies may lead to a higher expected return, but also a higher level of market volatility. The effects of volatility of the investments in the drawdown account 30 are explained below.

Based on the total value of the funds contributed, the expected returns of the investment strategy chosen for the drawdown account, and the initial allocation to the option annuity, the consumption amount and a deferral period are determined 330. The initial consumption amount is the expected payment to be made each payment cycle to the investor. The consumption amount is paid 340 to the investor for each payment cycle until 350 the deferral period is reach. The deferral period marks the horizon when the drawdown account 30 is expected to be depleted, which is when the annuity payments 380 will begin. In one embodiment, this initial allocation is determined according to a consumption model, the goal of which is to find the maximum level of expected consumption that is sustainable for some predetermined set of time. A natural consequence of maximizing an investor's consumption is that at the specified consumption horizon (which corresponds to the deferral period), the assets in the drawdown account 30 are depleted.

Figure 4:
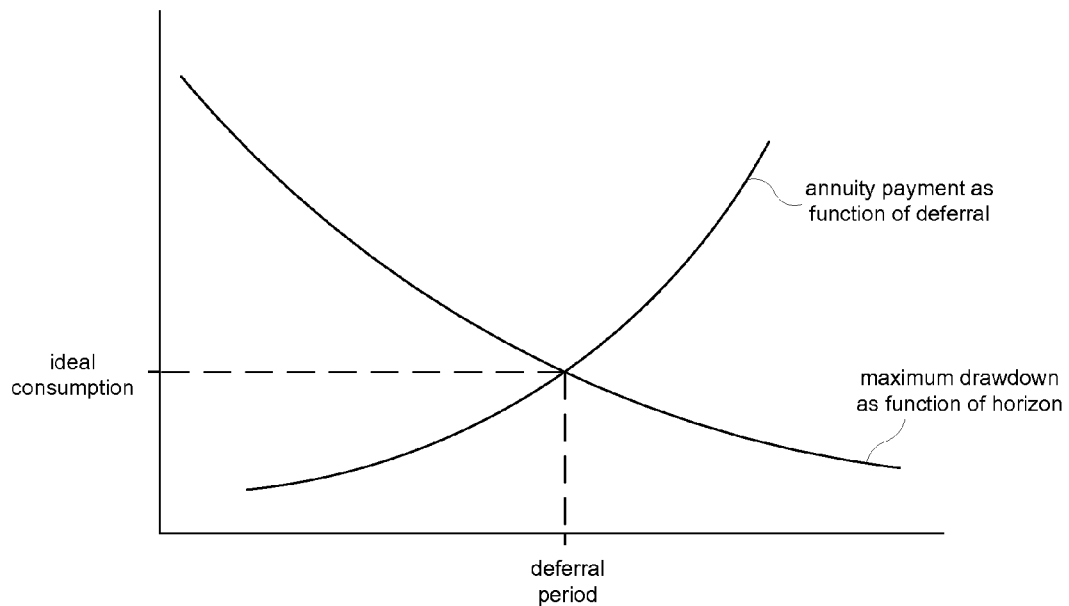
FIG. 4 is a graph illustrating how an initial allocation of a retirement fund between a drawdown account and an option annuity can be determined, in accordance with an embodiment of the invention.

FIG. 4 is a graph that illustrates how the initial allocation can be determined. A first curve is a plot of the maximum drawdown payments per period as a function of the horizon (i.e., where the horizon is measured as the number of payments that can be made). This curve is decreasing, as might be expected, because the longer the horizon (i.e. the longer the cash flow needs to be sustained), the smaller the magnitude of the consumption amount payment that is possible. A second curve shown in the graph of FIG. 4 is a plot of the lifetime annuity payments as a function of the deferral period (i.e., the payments from the option annuity 40 if the investor allows the option annuity 40 to accumulate for a period of time). This curve increases with time, since the value of the annuity payments are reinvested during the deferral period and thus accumulates over time, leading to a larger payment for when deferred longer.

When the model for drawing down assets is placed on the same graph as the plot of a deferred annuity, as in FIG. 4, it can be appreciated that the intersection of these curves is the level of income that can be sustained indefinitely in expectation space. In particular, this "ideal consumption" level can be maintained by paying the investor from the drawdown account 30 until the deferral period, at which time the drawdown account is depleted, but also the time at which the investor can begin to receive the same equal payments for life from the option annuity 40. When properly calibrated to one another, the expected cash flows of the drawdown account 30 and the option annuity match 40, providing the investor with a lifetime of expected payments at the maximized ideal consumption level. It should be understood that "depleted" in this sense means that the drawdown account 30 is substantially depleted (e.g., insufficient funds for additional payments of the consumption amount), and does not require that there be no assets remaining in the drawdown account 30, as funds may remain for a variety of reasons (e.g., overperforming in the last cycle, funds left over to cover management fees, etc.).

Because of market volatility, this result is not guaranteed. This is because, relative to expectations, the drawdown account 30 may overperform or underperform during the first phase of the retirement period. In this context, overperforming or underperforming is relative to the expected performance based on the strategy used to invest the assets in the drawdown account 30. In either case, such a deviation from the expected performance of the drawdown account 40 could result in (1) a non-uniform consumption over the remaining period of the investor's life, and/or (2) a remaining balance at the end of the investor's life. As explained above, violation of either of these conditions would lead to a less than optimal consumption during the retirement period, so embodiments of the invention seek to avoid these conditions from occurring.

Figure 5A:
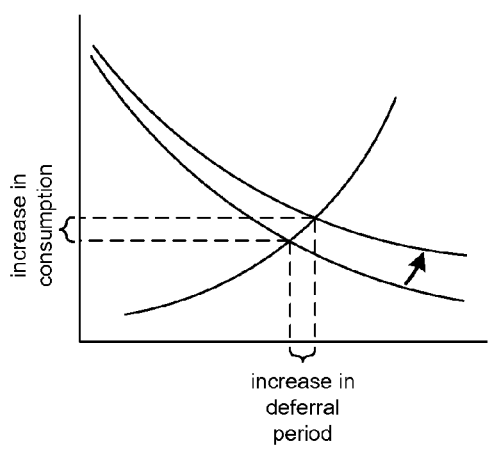
FIGS. 5A and 5B are graphs illustrating how the consumption and deferral period can change based on the performance of the drawdown account, in accordance with an embodiment of the invention.
Figure 5B:
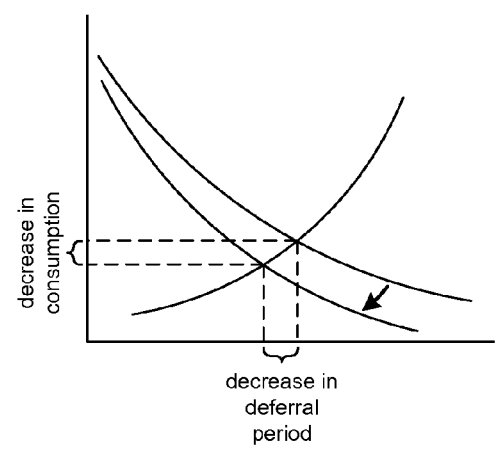

To address this concern, in embodiments of the invention, for each next payment period 370 during the drawdown stage of the strategy, the consumption and the deferral period are adjusted 380 whenever the drawdown account overperforms or underperforms expectations. The adjustments are made to maximize the investor's consumption for the remained of the retirement, based on the new information obtained form the drawdown account's actual performance. For example, when the drawdown account 30 overperforms expectations, as shown in FIG. 5A, the consumption amount is increased, and the expected deferral period is lengthened. Conversely, when the drawdown account 30 underperforms expectations, as shown in FIG. 5B, the consumption amount is decreased, and the deferral period is shortened. These adjustments continue and the corresponding payments of the consumption amount are made each period until the deferral period is reached.

When the deferral period is reached, the second phase of the retirement strategy begins, where the option annuity is exercised and the annuity payments begin to pay 360 to the investor for the remainder of the investor's life. The amount of this payment should approximately equal the last payment of the consumption amount from the drawdown account. However, for various reasons the annuity payments may not be exactly equivalent to the last consumption amount. In other embodiments, the option annuity may be exercised earlier or later than the deferral period, in which case the annuity payment may be less or more, respectively, than the consumption amount Option Annuity As mentioned above, the option annuity 40 may contain a novel type of annuity, referred to herein as an "option" annuity, which begins to pay at an optional date to be determined after the annuity contract is made. In contrast to conventional annuities, which are generally either immediate or deferred to a specific date, an option annuity begins receiving payments whenever the end beneficiary (or other third party) decides it most appropriate. Accordingly, conventional annuities are inappropriate for embodiments of the invention, where the deferral period may need to be revised when the drawdown account 30 overperforms or underperforms expectations.

The option annuity 40 is an arrangement whereby an immediate annuity has its cash flow directed to the purchase of more immediate annuities for some indeterminate period of time. By not immediately exercising the option to receive payments, the option annuity 40 can obtain greater payments the longer the option is deferred. During this accumulating phase, the level of income the option annuity 40 provides increases due to the purchase of additional annuity units. This increase continues until the beneficiary of the annuity chooses to end the accumulation phase, at which point the payments from the portfolio of immediate annuities are paid directly to the beneficial owner rather than being reinvested. This option annuity 40 can thus be beneficially paired with the drawdown account 30 to provide the highest level of sustained lifetime income for a given mix of liquid assets and annuities.

From a theoretical perspective, the pricing of an annuity is a fairly straightforward exercise. Much like a bond, its value is the sum of the discounted cash flows, but the key difference is that the cash flows are discounted by the mortality rate in addition to the interest rate, as described in:

$$A(t) = \sum_{n=1}^{\infty} c_n \cdot P_{Age}(n) \cdot e^{-n \cdot r(t+n)}$$

Where $A(t)$ is the price of an annuity at a point in time t, n is a discrete unit of time, $c_n$ is the magnitude of the cash flow at n, $P_{Age}(n)$ is the probability of an individual of a given age still being alive n periods in the future, $r(t+n)$ is the discount rate at t+n. This equation holds for both immediate and deferred fixed annuities; however, with deferred annuities some of the cash flows are zero.

For the purpose of calculating benefits and expected benefits, $c_n$ will be some constant and simply referred to as c. Thus, the price of a unit cash flow at time t will be $$\frac{A(t)}{c}.$$

If an investor purchased d dollars of annuity, they would have the right to begin immediately receiving a cash flow of:

$$f_t = d \cdot \frac{A(t_t)}{c}$$

As a fixed annuity, this payment would continue for the remainder of the investor's life. If the investor did not choose to terminate the accumulation phase, the cash flow $f_t$ would be reinvested in annuities so that:

$$f_{t+1} = f_t \cdot \left[1 + \frac{A(t_{t+1})}{c}\right]$$

This would be repeated until either the investor decided to begin receiving the payments directly or the investor died, in which case the contract would be worthless. The level of expected cash flows in the future as a function of deferral period can be derived using a bootstrapping method to estimate the future yield curve in combination with a mortality table with an adjustment factor to estimate future mortality rates. Once again, for notational convenience, let f(n) be the expected cash flow of an option annuity with a deferral length of n as calculated under the above described methodology. This would only provide an estimate of future income; the beneficial owner bears the realized reinvestment risk on the marginal annuity units.

Allocation of the Drawdown Account and Option Annuity

To maximize consumption using a drawdown strategy, in an embodiment of the invention, the manager determines two things: (1) the geometric mean of the portfolio, and (2) the length of time the income must last. The consumption-maximizing distribution results in an account value of zero at the end of this time period. The model for proportional drawdown as function of horizon, n, that satisfies this condition is as follows:

$$m(n) = \frac{\mu_g}{1 - e^{-\mu_g \cdot n}}$$

Where m is the annual proportional cash flow from the drawdown account, and $\mu_g$ is the expected annual geometric mean of the portfolio. The proportional cash flow from the drawdown account multiplied by the value of assets held gives the maximum level of sustainable expected cash flow. While constant in expectation space, the introduction of realized volatility would require a re-estimation of the level of sustainable income (i.e., consumption) each period.

Since $$\lim_{n \to 0} m(n) = \infty, \lim_{n \to \infty} f(n) = \infty, \frac{d}{dn} m(n) < 0, \text{ and } \frac{d}{dn} f(n) > 0,$$

for any combination of drawdown account, an option annuity has a unique n such that $v \cdot m(n) = f(n)$. This is subject to the constraint that both the value of the assets in the drawdown account, v, and the initial investment in the accumulation, d, are non-zero. At this point of equality, the given level of consumption is constant across any time horizon since the annuity will provide the income once the drawdown account is depleted. As is the case with the drawdown account as a standalone option, the level of consumption would have to be re-estimated and adjusted each period.

In one embodiment, the process of managing the combined strategy is performed as follows. Initially, an investor decides to place assets of value $v_o$ into the combined option annuity and drawdown account. Without loss of generality, the initial proportional allocation between the two strategies is defined as h to the drawdown and (1−h) to the option annuity.

If $\mu_a$ is the expected arithmetic mean return of the portfolio, and σ is the expected volatility, then the geometric mean as a function of the number of periods is given by:

$$\mu_g = (1 + \mu_a) \cdot \left[1 + \left(\frac{\sigma}{1 + \mu_a}\right)^2\right]^{\left(\frac{1}{2n} - \frac{1}{2}\right)} - 1$$

Therefore, the payment from the drawdown account as a function of how long the payments must last, n, is given by:

$$\frac{v_0 \cdot h \cdot \mu_g}{1 - e^{-\mu_g \cdot n}}$$

or $$\frac{v_0 \cdot h \cdot (1+\mu_a) \cdot \left(\left[1 + \left(\frac{\sigma}{1+\mu_a}\right)^2\right]^{\left(\frac{1}{2n}-\frac{1}{2}\right)} - 1\right)}{1 - e^{-n \cdot \left((1+\mu_a)\left[1+\left(\frac{\sigma}{1+\mu_a}\right)^2\right]^{\left(\frac{1}{2n}-\frac{1}{2}\right)}-1\right)}}$$

or $$v_0 \cdot h \cdot m(n)$$

which are all mathematically equivalent.

As described above, the expected cash flow from the option annuity as a function of deferral period is given by the recursive function:

$$f_n = f_{n-1} \cdot \left[1 + \frac{A(n)}{c}\right] \text{ Where } f_0 = (v_0 \cdot (1-h)) \cdot \frac{A(0)}{c}$$

The unique deferral period for the option annuity, $n_0$, such that $v_0 \cdot h \cdot m(n_0) - f_{n_0} = 0$, can be found by using any of a number of known methods for finding the roots of a function. This value is then be used to determine the payout from the drawdown account in the first period, which would be given by:

$$\delta_0 = v_0 \cdot h \cdot m(n_0)$$

Where $\delta_n$ is the cash flow proved in the $n^{th}$ period.

Over the following period, there will be some realized return x to the assets in the drawdown account, resulting in a new value of $(v_0 \cdot h - \delta_0) \cdot (1+x)$. This would also reset the base case for the recursive option annuity estimation:

$$f_0 \Rightarrow f_0 \cdot \left(1 + \frac{A(1)}{c}\right)$$

In the next period, therefore, the estimation of the optimal deferral period is given by finding the value $n_1$ such that:

$$(v_0 \cdot h \cdot \delta_0) \cdot (1+x) \cdot m(n_1) - f_{n_1} = 0$$

As before, this value for $n_1$ is used to calculate the appropriate payout from the drawdown fund. This process continues until $n_n = 0$, at which point the drawdown account is completely liquidated, and the accumulation phase of the annuity will have ended (i.e., the end of the deferral period is reached). For the balance of the investor's life, the investor receives income from the annuity rather than the sale of liquid assets from the drawdown account.

Cashing Out

Figure 6:
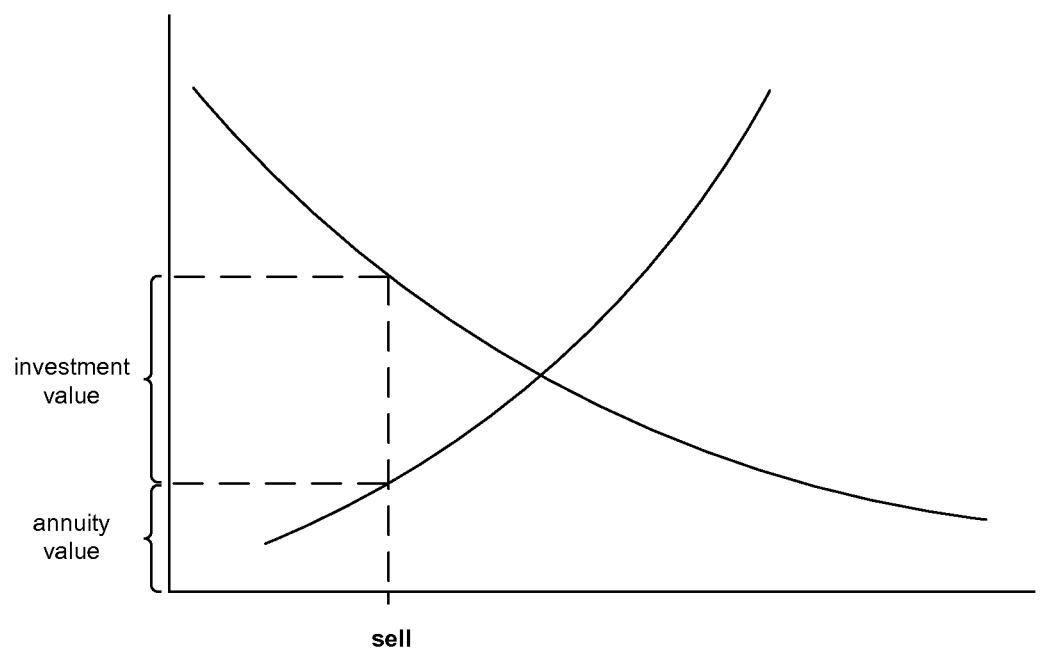
FIG. 6 is a graph illustrating the components of the retirement account if an investor cashes out before the deferral period, in accordance with an embodiment of the invention.

In one embodiment, an investor may cash out, or sell, the product during the first phase. During the first phase of the retirement strategy, the value of the investor's fund is held partially in the drawdown account 30 and partially in the option annuity 40. Therefore, as shown in FIG. 6, the investor would receive the remaining value of the drawdown account 30 as well as the annuity value of the option annuity 40. The latter may be achieved, for example, by the administrator exercising the option to end the deferral period early, so the investor begins to receive the annuity payments upon the sale.

After the deferral period, the decision to sell is moot, since the value of the drawdown account is zero, and the investor is already receiving the annuity payments.

Alternatives

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the art to convey the substance of their work effectively to others skilled in the art. These operations, while described functionally, computationally, or logically, may be understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Such a computer program may be stored in a tangible computer readable storage medium or any type of media suitable for storing electronic instructions. Embodiments of the invention may also relate to an apparatus for performing the operations described herein. This apparatus may be specially constructed for the required purposes, and/or it may comprise a general-purpose computing device selectively activated or reconfigured by a computer program stored in the computer.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method for managing a consumption strategy for an investor's retirement account, the method comprising: allocating funds from an investor's retirement account between a drawdown account and an option annuity; investing funds in the drawdown account using funds from the retirement account based on the allocating, wherein the drawdown account comprises assets invested in one or more markets; purchasing an option annuity using funds from the retirement account based on the allocating, wherein the option annuity accumulates value until the option annuity is exercised, at which time the option annuity provides payments to the investor for the remaining life of the investor; managing the drawdown account and the option annuity for the investor using an account manager configured to store account information for the drawdown account and the option annuity in an account data storage system; determining, using an allocation engine in a process executed by a computer processor, a consumption amount and a deferral period based on an expected performance of the drawdown account, wherein the consumption amount and the deferral period are determined such that: a payment of the consumption amount from the drawdown account for each of a series of payment cycles will deplete the drawdown account when the deferral period is reached, and when the deferral period is reached, the option annuity will have accumulated sufficient value to provide a payment per payment cycle for the life of the investor that is equal to the consumption amount; recording the consumption amount and the deferral period determined for the investor in the account data storage system; for each of plurality of payment cycles before the deferral period is reached, paying the determined consumption amount to the investor from the drawdown account; and after the deferral period is reached, exercising the option annuity so that the option annuity provides payments to the investor for the life of the investor.

2. The method of claim 1, further comprising: after each payment cycle, repeating the determining step to adjust the consumption amount and the deferral period for any deviation between the expected performance and an actual performance of the drawdown account during a previous payment cycle.

3. The method of claim 2, wherein repeating the determining step comprises, if the actual performance of the drawdown account exceeded the expected performance of the drawdown account during the previous payment cycle, increasing the consumption amount and the deferral period.

4. The method of claim 2, wherein repeating the determining step comprises, if the expected performance of the drawdown account exceeded the actual performance of the drawdown account during the previous payment cycle, decreasing the consumption amount and the deferral period.

5. The method of claim 1, wherein the funds from the investor's retirement account are allocated between the drawdown account and the option annuity to maximize the consumption amount.

6. The method of claim 1, further comprising: determining an investment allocation of assets in the drawdown account as a function of a risk profile for the investor.

7. The method of claim 1, wherein the option annuity comprises a plurality of annuity contracts.

8. The method of claim 1, wherein the option annuity is exercised when the deferral period is reached.

9. The method of claim 1, wherein the option annuity accumulates value for a period of time after the deferral period is reached.

10. The method of claim 1, wherein drawdown account is completely depleted when the deferral period is reached.

11. A computer program product for allocating funds for the purpose of managing a consumption strategy for an investor's retirement account, the computer program product comprising a computer-readable storage medium containing computer program code for: receiving an indication of an amount of funds invested from an investor's retirement account into a drawdown account, wherein the drawdown account comprises assets invested in one or more markets; receiving an indication of an amount of funds from an investor's retirement account used to purchase an option annuity, wherein the option annuity accumulates value until the option annuity is exercised, at which time the option annuity provides payments to the investor for the remaining life of the investor; storing account information for the drawdown account and the option annuity in an account data storage system; determining a consumption amount and a deferral period based on an expected performance of the drawdown account, wherein the consumption amount and the deferral period are determined such that: a payment of the consumption amount from the drawdown account for each of a series of payment cycles will deplete the drawdown account when the deferral period is reached, and when the deferral period is reached, the option annuity will have accumulated sufficient value to provide a payment per payment cycle for the life of the investor that is equal to the consumption amount; recording the consumption amount and the deferral period determined for the investor in the account data storage system; outputting the consumption amount to indicate how much to pay the investor from the drawdown account for each of plurality of payment cycles before the deferral period is reached; and outputting the deferral period to indicate when the option annuity is to be exercised so that the option annuity provides payments to the investor for the life of the investor.

12. The computer program product of claim 11, the computer-readable storage medium further containing computer program code for: after each payment cycle, repeating the determining to adjust the consumption amount and the deferral period for any deviation between the expected performance and an actual performance of the drawdown account during a previous payment cycle.

13. The computer program product of claim 12, wherein repeating the determining step comprises, if the actual performance of the drawdown account exceeded the expected performance of the drawdown account during the previous payment cycle, increasing the consumption amount and the deferral period.

14. The computer program product of claim 12, wherein repeating the determining step comprises, if the expected performance of the drawdown account exceeded the actual performance of the drawdown account during the previous payment cycle, decreasing the consumption amount and the deferral period.

15. The method of claim 11, the computer-readable storage medium further containing computer program code for: determining an investment allocation of assets in the drawdown account as a function of a risk profile for the investor.

16. A retirement fund management system for managing a consumption strategy for an investor's retirement account, the system comprising: a processor; a memory for storing a plurality of software modules thereon; an account manager module stored on the memory, the account manager module configured to maintain account information for a drawdown account and an option annuity in an account data storage system, wherein the drawdown account comprises assets invested in one or more markets, and wherein the option annuity accumulates value until the option annuity is exercised, at which time the option annuity provides payments to the investor for the remaining life of the investor; an allocation engine configured to determine a consumption amount and a deferral period based on an expected performance of the drawdown account, wherein the consumption amount and the deferral period are determined such that: a payment of the consumption amount from the drawdown account for each of a series of payment cycles will deplete the drawdown account when the deferral period is reached, and when the deferral period is reached, the option annuity will have accumulated sufficient value to provide a payment per payment cycle for the life of the investor that is equal to the consumption amount; a payment engine configured to cause a payment to the investor from the drawdown account of the consumption amount for each of plurality of payment cycles before the deferral period is reached; and an annuity provider interface configured to indicate an expiration of the deferral period for exercising the option annuity and initiate payments to the investor for the life of the investor.

17. The system of claim 16, wherein the allocation engine is further configured to, after each payment cycle, adjust the consumption amount and the deferral period for any deviation between the expected performance and an actual performance of the drawdown account during a previous payment cycle.

18. The system of 16, wherein the allocation engine is further configured to allocate funds from an investor's retirement account between a drawdown account and an option annuity.

19. The system of claim 16, wherein the allocation engine is further configured to allocate funds from an investor's retirement account between a drawdown account and an option annuity to maximize the consumption amount.

20. The system of claim 16, further comprising: an investment manager module configured to determine an investment allocation of assets in the drawdown account as a function of a risk profile for the investor.

* * * * *